United States Patent Office 2,719,584
Patented Oct. 4, 1955

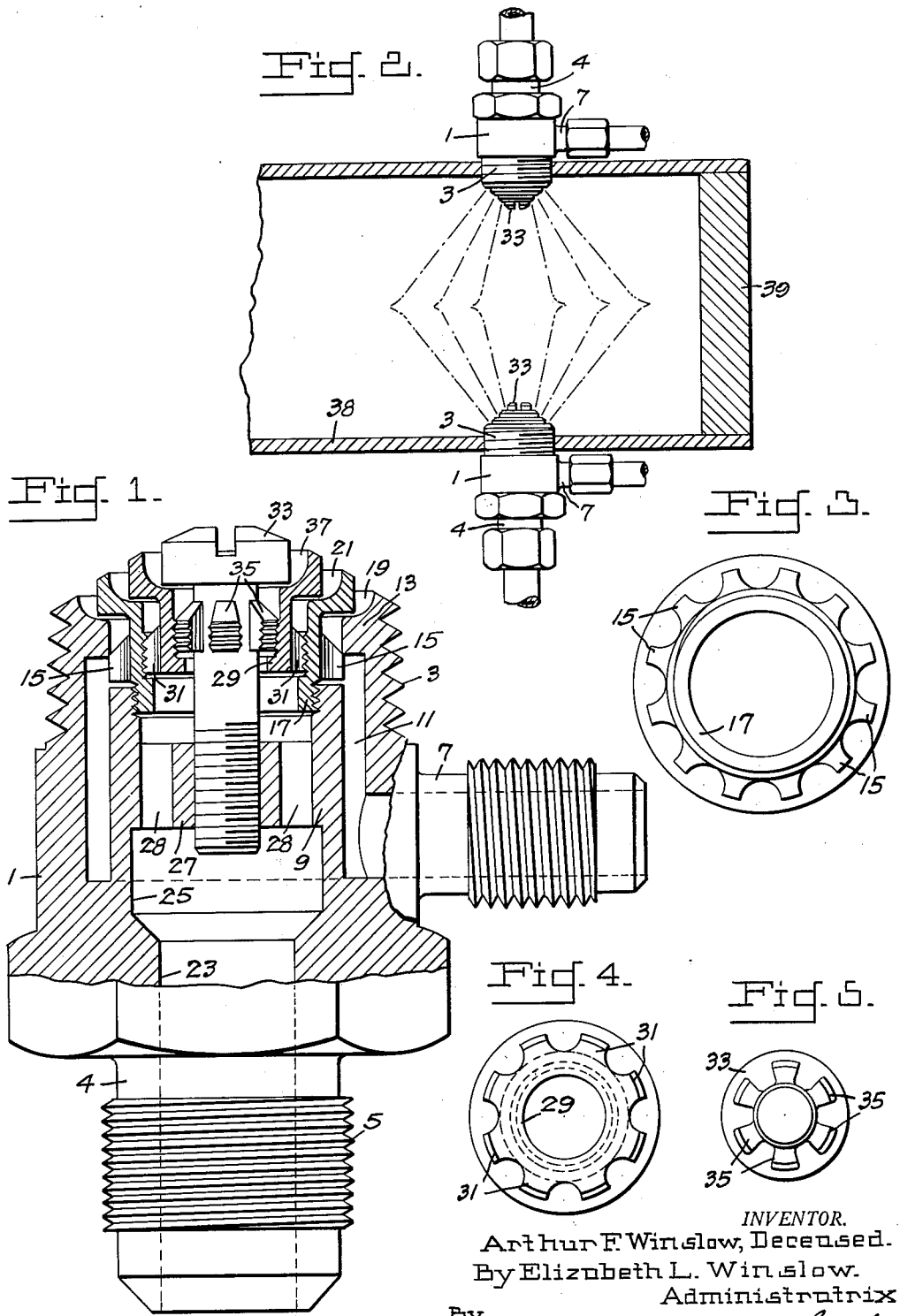

2,719,584

NOZZLE FOR ROCKET MOTOR

Arthur F. Winslow, deceased, late of Schenectady County, N. Y., by Elizabeth L. Winslow, administratrix, New York, N. Y., assignor to the United States of America as represented by the Secretary of the Army Application March 5, 1953, Serial No. 340,498

4 Claims. (Cl. 158—76)

This invention relates to combustion apparatus particularly intended for use in aircraft having the rocket type of propulsion.

In a rocket motor the products of combustion of liquid fuels at a very high temperature are continuously discharged from a rearwardly open nozzle to produce the desired thrust. It is the usual practice to introduce the fuels or reactants into a chamber through a nozzle which will atomize and mix the fuels in such a manner that a correctly proportioned homogenous mixture will result which can readily be vaporized and burned.

One of the difficulties experienced with the nozzles now used has been the tendency of the nozzle to form "hot spots" on the combustion chamber walls which spots rapidly lose their structural strength and lead to the failure of the motor. I have found that these hot spots can be eliminated in a rocket using a fuel, for example, alcohol and liquid oxygen if the oxygen spray from the nozzle is enclosed by the alcohol spray.

It is therefore the general object of my invention to improve upon the combustion chamber nozzles now used.

It is a more specific object of my invention to provide a novel combustion chamber nozzle arrangement that will not develop hot spots on the interior walls of the chamber.

With the foregoing objects in view reference is had to the accompanying drawing for an illustrative embodiment of the invention wherein:

Figure 1 is an elevation partly in section showing my novel nozzle arrangement.

Figure 2 is a longitudinal elevation of a portion of a rocket combustion chamber showing the nozzles in their preferred positions.

Figure 3 is a bottom view of a detail of my nozzle.

Figure 4 is a bottom view of a detail of my nozzle.

Figure 5 is a bottom view of a detail of my nozzle.

Referring to the accompanying drawings wherein similar reference characters designate similar parts throughout 1 indicates a body member exteriorly threaded as at 3 to cooperate with a threaded port in a combustion chamber and having a portion therof, 4 of reduced diameter threaded as at 5 to receive a pipe coupling for conduction of oxygen to the nozzle. A threaded arm 7 extends at substantially a right angle to the body member to receive a pipe coupling for conducting alcohol to the nozzle.

The interior of the body member is divided into a number of chambers by partitions or walls therein to insure that the fuel and the oxygen mix at the exit, as will later appear. An annular partition 9 is formed integral with and spaced from the outside wall of body member 1 and a chamber 11 is thus created to receive the fuel from pipe 7. Shoulder 13 extends across chamber 11 and abuts fingers 15 radiating out from bushing 17, seen in Figure 3, which is threaded into partition 9. An outwardly flaring lip 19 is formed at the outer end of wall 1 to give a conical form to the fuel flowing through the spacing between fingers 15 and then between the body wall 1 and bushing 17. It can be readily seen that a fuel introduced under pressure through arm 7 will pass through chamber 11, between fingers 15 and out through lip 19 in a conical divergent spray.

Cavity 23 extends longitudinally through the body member and flares outwardly to form a chamber 25. Partition 27 is supported within the chamber by web members (not shown) radiating outwardly to partition 9 and providing longitudinal passages 28 therebetween.

Bushing 29 seen in Figure 4 having integral threaded fingers 31 radiating outwardly threads into bushing 17 substantially as shown and plug 33 having similar threaded fingers 35 screws into the interior periphery of bushing 29 and into partition 27. The outer ends of bushings 29 and 17 are formed into outwardly flaring lips 37 and 21 respectively. It can be seen that when oxygen be introduced under pressure into pipe 5 it will pass through cavity 23 and upward between interstices formed by fingers 31 and 35 and out through lips 21 and 37 to form two concentric divergent conical sprays within the outer spray from lip 19.

Figure 2 illustrates a preferred method of mounting my nozzles in a rocket combustion chamber. Reference numeral 38 indicates generally a combustion chamber wall closed at one end thereof by plug 39. The two nozzles are firmly screwed into the wall in facing relation substantially as shown and when a fuel such as alcohol and liquid oxygen are admitted under pressure to their respective arms they emerge from the outwardly flaring lips in a series of concentric cones that intersect at the center of the chamber whereby the fuel and oxygen are intimately mixed. It will be noted that the oxygen spray is completely surrounded by the alcohol and there is no possibility of the formation of hot spots caused by the impinging of an oxygen spray on the wall.

Alcohol has been used as an example of a fuel and since it requires more than its weight of oxygen for proper combustion two of the three conical sprays have been indicated as oxygen. However it will be understood that ratio of fuel to oxygen or oxidizer sprays may be selected depending on the propellants used.

Although the present invention has been described in conjunction with preferred embodiments, it is to be understood that modifications and variations may be resorted to without departing from the spirit and scope of the invention as those skilled in the art will readily understand. Such variations and modifications are considered to be within the purview and scope of the invention and the appended claims.

I claim:

1. A combustion chamber nozzle comprising in combination a body member having a hollow arm extending therefrom at a substantial angle, a partition within and spaced from the said body member forming a chamber communicating with said hollow arm, said chamber terminating in a flared lip at one end of said body member, a longitudinal passage extending through said body member and formed in part at least by said partition, a first bushing fixed to said partition and terminating in a flared lip in contiguous relation to said one end of said body member, a second bushing nested within said first bushing and concentric therewith, and a plug within and concentric with said second bushing and extending into said passage.

2. A nozzle for use in aircraft having the rocket type of propulsion comprising in combination a body member, an annular partition within and spaced from said body member forming a chamber for receiving a fuel, said chamber terminating in an outwardly flaring lip, a longitudinal cavity for receiving a reactant for said fuel extending through said body member and formed in part at least by said partition, a first bushing member engaging said partition and including radial fingers reaching into the said chamber, a second bushing member within and concentric with said first bushing member, said first and second bushing members terminating respectively in an outwardly flared lip, and a plug member extending through said second bushing and into said longitudinal cavity.

3. A combustion chamber nozzle for use with a rocket of the type using a liquid fuel and liquid oxygen comprising in combination a body member having a hollow arm extending therefrom at a substantial angle and adapted to receive fuel, a partition in said body member forming a chamber to receive said fuel, said chamber terminating in an opening formed by an annular flared lip, a passage extending longitudinally through said body member and adapted at one end thereof to receive liquid oxygen, two spaced bushings nested within the said passage at the other end thereof and a plug member received within the innermost said bushing, the said plug and the said bushings disposed coaxially of the said flared lip.

4. A combustion chamber nozzle comprising in combination a body member having a hollow arm extending normally therefrom, a partition within and spaced from the said body and forming a chamber communicating with said arm, said chamber terminating in an annular flared lip at one end of the said body member, the said arm adapted to receive a fuel at the distal end thereof, a longitudinal passage extending through said body member and formed in part at least by said partition, a first bushing fixed to said partition and terminating in a flared lip in contiguous relation to said one end of said body member, a second bushing nested within said first bushing and spaced therefrom, and a plug member received within said second bushing and extending into said passage, the said passage adapted to receive liquid oxygen.

References Cited in the file of this patent

UNITED STATES PATENTS

| | | |
|---|---|---|
| 1,464,268 | Keller | Aug. 7, 1923 |
| 1,713,260 | Chandler | May 14, 1929 |
| 2,049,150 | Bencowitz et al. | July 28, 1936 |
| 2,647,364 | Dreibelbis | Aug. 4, 1953 |